United States Patent [19]
Kishi et al.

[11] 3,794,885
[45] Feb. 26, 1974

[54] STATIC TYPE ELECTRIC CIRCUIT BREAKER

[75] Inventors: Heiji Kishi, Tokyo; Katshuiko Takigami, Kawasaki; Yoshihiro Shirasaka, Yokohama, all of Japan

[73] Assignee: Tokyo Shibaura Electric Company, Ltd., Kanagawa-ken, Japan

[22] Filed: Nov. 9, 1972

[21] Appl. No.: 305,080

[30] Foreign Application Priority Data
Nov. 10, 1971 Japan.................................. 46/89066

[52] U.S. Cl. ......... 317/33 SC, 321/45 C, 323/22 SC
[51] Int. Cl. .............................................. H02h 7/20
[58] Field of Search......... 317/33 SC; 321/45 C, 14; 323/24, 22 SC

[56] References Cited
UNITED STATES PATENTS

| | | | |
|---|---|---|---|
| 3,629,613 | 12/1971 | Feige............................... | 317/33 SC |
| 3,558,983 | 1/1971 | Steen .............................. | 317/33 SC |
| 3,375,428 | 3/1968 | Mitchell.......................... | 323/22 SC |
| 3,372,324 | 3/1968 | Scarlett........................... | 323/22 SC |
| 3,335,360 | 8/1967 | Reinert ........................... | 323/22 SC |

*Primary Examiner*—James D. Trammell
*Attorney, Agent, or Firm*—Oblon, Fisher, Spivak, McCelland & Maier

[57] ABSTRACT

A single-phase full-wave type rectifier bridge is respectively provided within selected phases of A.C. line conductors and in series therewith to provide for the switching of an A.C. load current. Each rectifier bridge has four arms two of which respectively include a main thyristor and the other two arms of which respectively include a main diode. Additionally, the rectifier bridge functions such that one of the main thyristors passes a positive half wave of current therethrough, the other main thyristor passes a negative half wave of current therethrough, one of the main diodes becomes conductive during a positive half wave of the current and the other of the main diodes becomes conductive during a negative half wave of the current. A reactor is connected across the D.C. output terminals of the rectifier bridge for conduction of the load current. A series combination of a commutating capacitor and an auxiliary thyristor is connected between an intermediate connection point of the main thyristors of the rectifier bridge and other terminals of the main thyristors through an auxiliary diode. The commutating capacitor is normally charged from an auxiliary D.C. voltage supply and is discharged to negatively bias the main thyristor which is conductive when the auxiliary thyristor is turned on when a circuit-interruption is required.

8 Claims, 4 Drawing Figures

STATIC TYPE ELECTRIC CIRCUIT BREAKER

BACKGROUND OF THE INVENTION

1. Field of the Invention

This invention relates to a static type electric circuit breaker in which A. C. load interruption can be satisfactorily made.

2. Description of the Prior Art

As is well known, there have been various types of static circuit breakers using thyristors therein. The prior art static circuit breakers have had at least one thyristor through which a full-wave rectified load current to be interrupted was passed. There are, however, various types of loads which require a lagging current of a higher amplitude. In such cases, it is understood that each rectified half wave of current could not accurately reach zero at the end of the half cycle thereof because of an inherent lagging power factor of the load. Accordingly, in the past it was impossible to interrupt an A.C. load current by the gate turn-off of a thyristor when the amplitude of the current at the end of the half wave exceeded the holding current level. Moreover, it was also impossible in the past to provide power control of the load by the gate control.

SUMMARY OF THE INVENTION

It is therefore an object of the present invention to provide a new and improved unique static type electric current breaker in which a single-phase full-wave rectifier bridge including a pair of main thyristors each capable of passing a half wave of an A. C. load circuit therethrough, is located within a line conductor to control and interrupt the A. C. load current.

Another object of the present invention is to provide a new and improved unique static type poli-phase circuit breaker in which a single unit of commutating capacitor is employed to cause the main thyristors provided in a single-phase full-wave rectifier bridge of poli-phase line conductors to turn off.

Briefly in accordance with one aspect of the invention the foregoing and other objects are attained by the provision of single-phase full-wave type rectifier bridges respectively located within three-phase line conductors for energization of an electric load. Each rectifier bridge comprises a pair of main thyristors and a pair of main diodes, one of the main thyristors and the main diodes allows a positive half wave of load current to pass therethrough and the other of the main thyristors and the main diodes allows a negative half wave of load current to pass therethrough. A reactor is connected across the D. C. output terminals of each of the rectifier bridges to enable the A. C. load current to pass therethrough. A series combination of a commutating capacitor and an auxiliary thyristor is connected between an intermediate point of the main thyristors and the A. C. terminals of the respective rectifier bridges through auxiliary diode units in order to prevent a reverse current. The commutating capacitor is normally charged from an auxiliary D. C. voltage supply and supplies a discharge current for the main thyristors for interruption of the A. C. load circuit.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
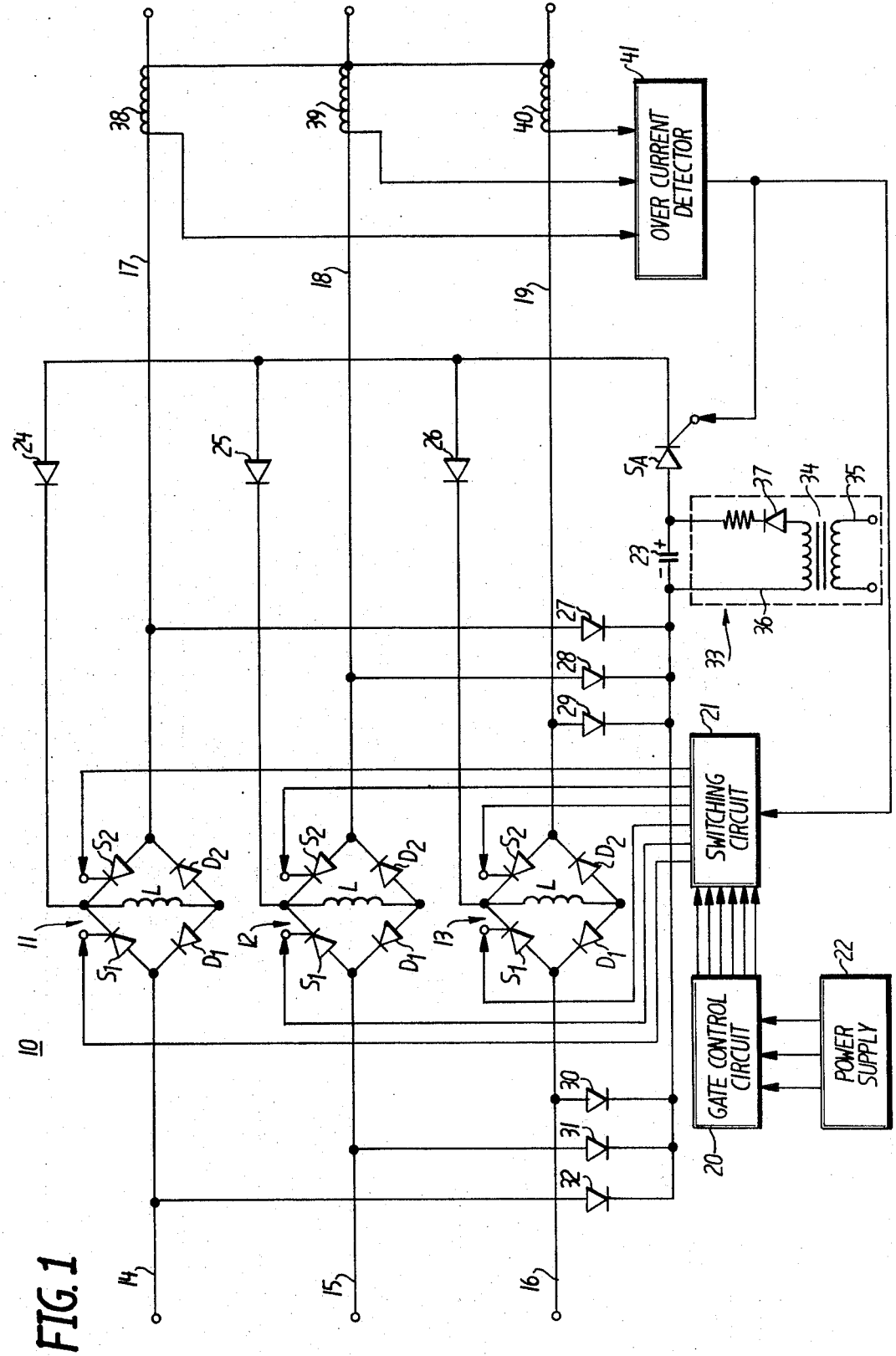
FIG. 1 is a circuit diagram showing a preferred embodiment of a static type electric circuit breaker in accordance with the present invention.

Referring now to the drawings, wherein like reference numerals designate identical or corresponding parts throughout the several views and more particularly to FIG. 1 thereof, wherein one preferred embodiment of a static type electric circuit breaker 10 in accordance with the invention is shown as including single-phase full-wave rectifier bridges 11, 12 and 13 are connected in series and are respectively located within three-phase line conductors.

The leftward line conductors 14, 15 and 16 are connected to a three-phase A.C. voltage supply (not shown) and the rightward line conductors 17, 18 and 19 are connected to suitable A. C. loads, such as electric furnaces, electric motors and the like.

The rectifier bridge 11 has four arms, two of which include respective main thyristors S1 and S2 and the other two arms of which include respective main diodes D1 and D2.

The thyristors S1 and S2 and the diodes D1 and D2 are arranged so as to have conductive polarities as follows. The main thyristor S1 and the main diode D2 are to be conductive during a positive half wave of the A. C. load current and the main thyristor S2 and the main diode D1 are to be conductive during a negative half wave of the A. C. load current. A reactor L is connected across the D. C. output terminals of the rectifier bridge 11. Since the rectifier bridges 12 and 13 have similar components to those of the rectifier bridge 11, the description of them is eliminated.

The main thyristors S1 and S2 are gated by a gate control circuit 20 through a switching circuit 21 which either passes or prevents electric signals from the gate control circuit 20. Gate control circuit 20 is of a conventional type and is energized from an auxiliary A. C. voltage supply 22.

In order to make the interruption of an electric circuit, the series combination of a commutating capacitor 23 and an auxiliary thyristor SA is provided. The cathode of the thyristor SA is respectively connected to an intermediate point of thyristors S1 and S2 of the bridges 11, 12 and 13 through auxiliary diodes 24, 25 and 26 as shown. Auxiliary diodes 27, 28 and 29 having a conductive polarity as shown are connected between the line conductors 17, 18 and 19 and a leftward terminal of the line conductors 17, 18 and 19 and a leftward terminal of the commutating capacitor 23. Similarly, auxiliary diodes 30, 31 and 32 having a conductive polarity as shown are connected between the line conductors 14, 15 and 16 and the leftward terminal of the commutating capacitor 23. An auxiliary D. C. voltage supply, which is generally shown with a reference numeral 33, is provided for normally charging the commutating capacitor 23. The auxiliary D. C. voltage supply 33 includes an auxiliary transformer 34 having a primary winding 35, which is energized from an auxiliary A. C. voltage supply, and a secondary winding 36, and a diode 37 which is serially connected with one terminal of the secondary winding 36 to rectify an A. C. voltage for charging the commutating capacitor 23 with a predetermined polarity as shown.

The static type electric circuit breaker 10 is further provided with current transformers 38, 39 and 40 which in turn respond to a load current passing through the line conductors 14 to 19 and supply a current signal to an overcurrent detector 41.

The overcurrent detector 41 may be constructed out of any suitable level detecting means such, for example, as a Schmitt trigger, a combination of a Zener diode and a integrator and the like. The overcurrent detector 41 generates an output signal therefrom for turning the thyristor SA on and for turning the switching circuit 21 off when an excessive current is passed through the line conductors, and thereby causes conduction of the bridges to stop.

In operation, it will be easily understood that the electric circuit breaker 10 can be operated as a power control device which is controlled by the gate angle of the thyristors $S1$ and $S2$ of the bridges 11, 12 and 13 by the output signal which is emitted from the gate control circuit 20, during normal operation of the electric circuit.

On the other hand, if it is assumed that a fault such as a short circuit of the electric load has occurred in the electric circuit, then the overcurrent detector 41 will detect the overcurrent condition and emit an output signal therefrom to turn the thyristor SA on and to stop the output signal of the switching circuit 21. The commutating capacitor 23 will then discharge the electric charges thereof from its rightward terminal through the thyristor SA, the diode 24, the thyristor $S_1$ and the diode 32 to the leftward terminal thereof during which time the thyristor $S_1$ is conductive. On the other hand, the electric charges of the commutating capacitor 23 will be discharged therefrom through a path which serially includes the thyristor SA, the diode 24, the thyristor $S_2$ and the diode 27. As a result thereof, either thyristor $S_1$ or $S_2$ is turned off by a reverse current passing therethrough, and the bridge 11 will interrupt the load current passing from the line conductor 14 to the line conductor 17.

It can be seen that the aforementioned capacitor discharge is equally made for the other bridges 12 and 13 to interrupt the load circuit from the A. C. voltage supply.

A manual switching operation of the static type electric circuit breaker 10 can be, of course, easily made during the normal operation of the electric circuit for example, by manually adding a trigger signal to the thyristor SA and the switching circuit 21.

Figure 2:
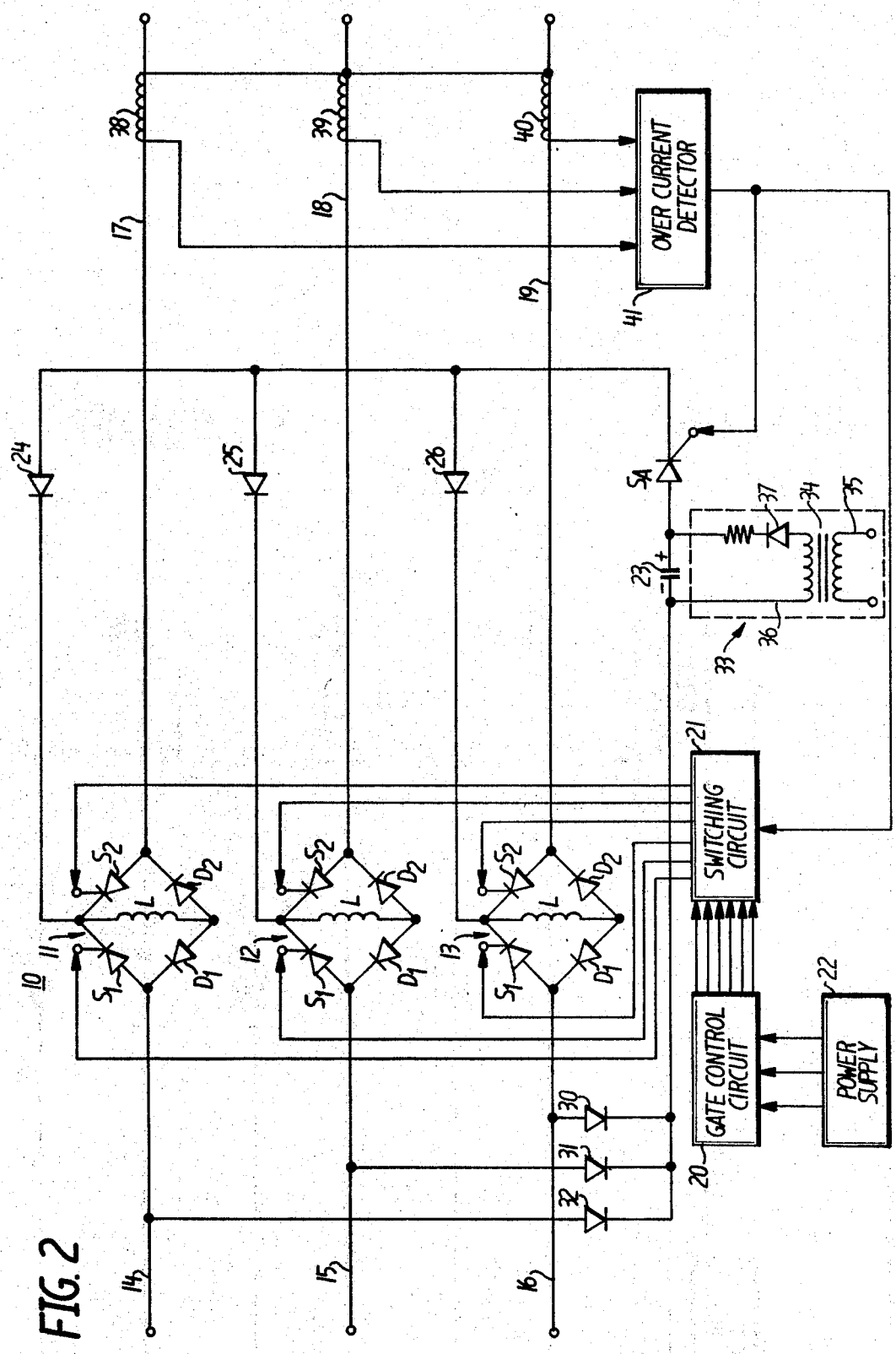
FIG. 2 is a similar circuit diagram showing another and alternative preferred embodiment of the invention.

In accordance with another embodiment as shown in FIG. 2, the diodes 27, 28 and 29 of the static type electric circuit breaker 10 of FIG. 1 are eliminated. It should be understood that although the turn-off of the thyristor $S_1$ of the bridges 11, 12 and 13 is made in a similar manner to that of FIG. 1, the turn-off of the thyristors $S_2$ of the bridges 11, 12 and 13 is somewhat different therefrom.

For convenience of explanation, it is assumed that the thyristor $S_2$ of the bridge 11 is turned off during the turn-on thereof. If the output signal of the overcurrent detector 41 is applied to the thyristor SA for turn-on thereof and applied to the switching circuit 21 for stopping the application of gating signals to the thyristors $S_1$ and $S_2$, then the electric charges of the commutating capacitor 23 will be discharged therefrom through a path which serially includes the thyristor SA, the diode 24, the thyristor $S_2$, the line 17, the load, either line 18 or 19, the diodes $D_2$ and $D_1$ of either the bridge 12 or 13 and either diode 31 or 30. In this way, the thyristor $S_2$ of the bridge 11 is turned off because of a reverse current passing therethrough.

It will be apparent that the thyristors $S_2$ of the bridges 12 and 13 can be turned off in similar manner to the above description.

Further to the above, it should be apparent that the static type electric circuit breaker 10 of FIG. 2 can be manufactured inexpensively compared with that of FIG. 1 because of the lack of the diodes 27, 28 and 29 of FIG. 1.

Figure 3:
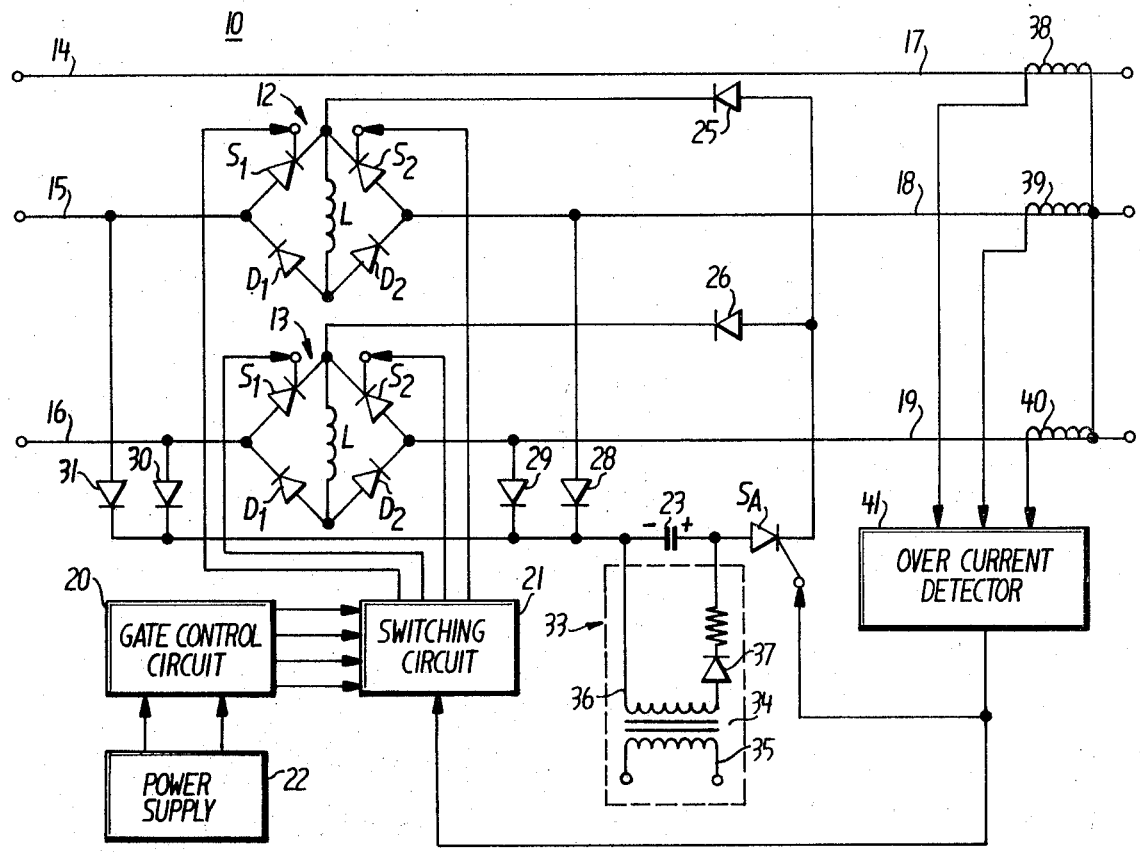
FIG. 3 is a circuit diagram of a still further preferred embodiment of the present invention; and, FIG. 4 is a similar circuit diagram of yet still a further preferred embodiment of the present invention.

FIG. 3 shows a further embodiment of the present invention, in which the first rectifier bridge 11 is eliminated from FIG. 1. The static type electric circuit breaker 10 of this type is more inexpensive to manufacture than that of FIG. 2 except that a single line ground occurring in line conductor 17 cannot be removed therefrom. It will be easily understood that diodes 28 and 29 can be eliminated from the circuit shown in FIG. 3 in accordance with the teachings disclosed in FIG. 2.

Figure 4:
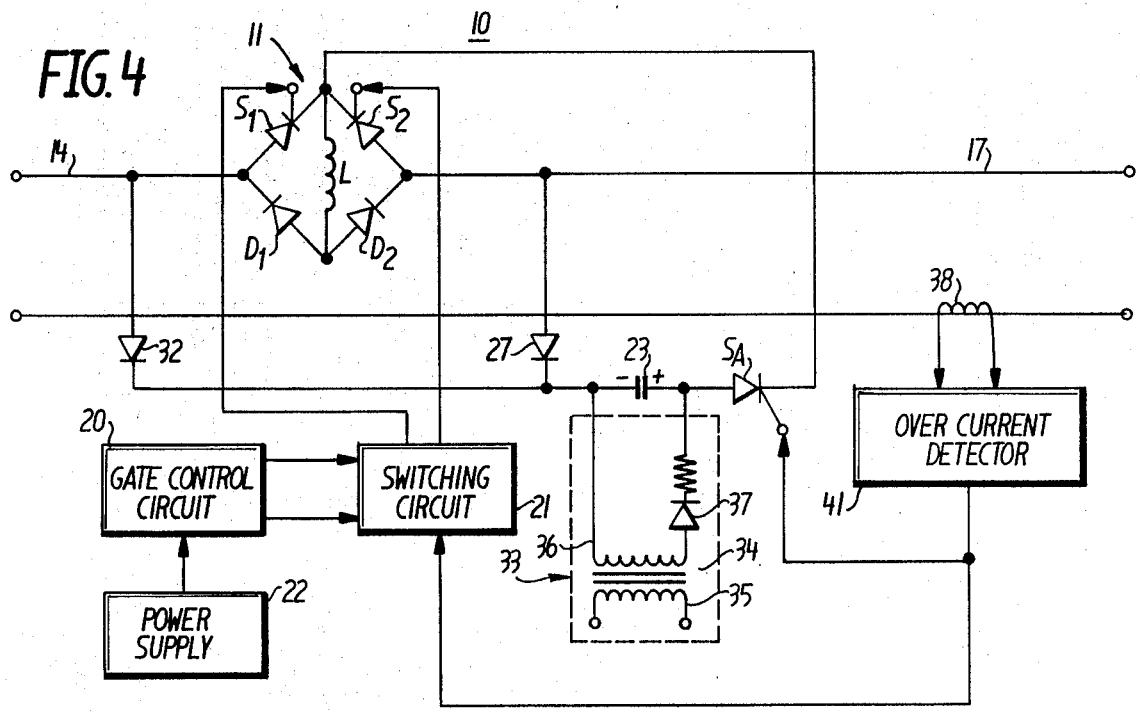

Referring now to FIG. 4, it is seen that the present invention can be practiced for the power interruption and the power control of a single-phase electric circuit. Since the components and the operation of the circuit of FIG. 4 are almost similar to those of one phase shown in FIG. 1, the description thereof is omitted.

From the above, in accordance with the present invention, it is possible to provide a power control for an electric load under the conventional gate control of the thyristors $S_1$ and $S_2$ because the thyristor $S_1$ functions to enable a positive half wave of the load current to pass therethrough, and the thyristor $S_2$ functions to enable only a negative half wave of the same to pass therethrough.

Additionally, with the present invention an A. C. electric circuit can be interrupted by discharging the commutating capacitor 23 through the auxiliary thyristor SA when either a fault has occurred or a normal load interruption is desired.

It can be seen that the discharge current from the commutating capacitor 23 does not instantaneously pass through the reactor L but passes through the main thyristor $S_1$ or $S_2$, which is in conduction, in a reverse direction, until such time as the reverse current exceeds the forward current therethrough to thereby turn off the thyristor. According to Lenz's law, an opposing electromotive force will be induced in reactor L to oppose any change in current therethrough, whereby reactor L acts initially as a very effective open circuit to force all the current through the conducting thyristor to aid in turning it off.

With the poli-phase static type electric circuit breakers disclosed in FIGS. 1 to 3, only one unit of the commutating capacitor 23 having the auxiliary D. C. voltage supply 33 for charging the capacitor need be commonly employed for a plurality of rectifier bridges to simultaneously turn the main thyristors provided therein off.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A static type electric circuit breaker comprising:
a plurality of rectifier bridges each respectively being connected in selected phases of A.C. line conductors and in series therewith, each of said rectifier bridges having four arms two arms of which respectively include a main thyristor unit and the other two arms of which respectively include a main diode unit, one set of main thyristor units and said main diode units of each rectifier bridge allowing a positive half wave of A.C. current to pass therethrough and the other set of said main thyristor units and said main diode units of each bridge allowing a negative half wave of A.C. current to pass therethrough;
a reactor connected across the D.C. output terminals of each of said rectifier bridges and allowing full waves of A.C. current to pass therethrough;
means for commutating said main thyristor units, said means consisting of a series combination of a single commutating capacitor unit and a single auxiliary thyristor unit, said commutating capacitor unit being normally charged with a predetermined polarity from an auxiliary D. C. voltage supply,
means for discharging electric charges of said commutating capacitor unit in a reverse polarity to those of said main thyristor units of each of said rectifier bridges which are conducting; and,
a gate control circuit means for applying gate control signals to said main thyristor units of each of said rectifier bridges and for applying gate turn-off signals to said auxiliary thyristor unit.

2. A static type electric circuit breaker according to claim 1, wherein: said discharging means of electric charges of said commutating capacitor unit includes a diode unit respectively connected between A. C. terminals of each of said rectifier bridges adjacent to an A. C. voltage supply and one terminal of said commutating means.

3. A static type electric circuit breaker according to claim 1, wherein:
said discharging means of electric charges of said commutating capacitor unit include a first diode unit respectively connected between A. C. terminals of each of said rectifier bridges adjacent to an A. C. voltage supply and one terminal of said commutating means, and a second diode unit respectively connected between A. C. terminals of each of said rectifier bridges adjacent to an A. C. load and the same said terminal of said commutating means.

4. A static type electric circuit breaker according to claim 2, wherein:
an auxiliary diode unit is respectively connected between a serially interconnected point of said main thyristor units of each of said rectifier bridges and the other terminal of said commutating means.

5. A static type electric circuit breaker according to claim 3, wherein:
an auxiliary diode unit is respectively connected between a serially interconnected point of said main thyristor units of each of said rectifier bridges and the other terminal of said commutating means.

6. A static type electric circuit breaker according to claim 1, wherein:
said gate control circuit means includes:
an overcurrent detector for generating an output signal in response to a predetermined overcurrent condition of said A. C. line conductors and for applying said output signal to said auxiliary thyristor unit to make it turn on,
a gate control for controlling the gate angle of said main thyristor units of each of said rectifier bridges, and
a switching circuit for normally applying the control signal of said gate control to said main thyristor units of each of said rectifier bridges only when the output signal of said overcurrent detector is absent.

7. A static type electric circuit breaker according to claim 1 wherein one of said rectifier bridges is omitted from one of said A. C. line conductors.

8. A static type electric circuit breaker comprising:
a rectifier bridge connected to a line of a single-phase A.C. voltage supply, said rectifier bridge having four arms two arms of which respectively include a main thyristor unit and the other two arms of which respectively include a main diode unit, one set of said main thyristor units and said diode units permitting a positive half wave of A.C. current to pass therethrough and the other set of said main thyristor units and said diode units permitting a negative half wave of A. C. current to pass therethrough;
a reactor connected across D.C. output terminals of said rectifier bridge and permitting full waves of A.C. current to pass therethrough;
means for commutating said main thyristor units, said means consisting of a series combination of a single commutating capacitor unit and a single auxiliary thyristor unit, said commutating capacitor unit being normally charged with a predetermined polarity from an auxiliary D. C. voltage supply;
means for discharging electric charges of said commutating capacitor through said main thyristor unit which is conducting in a reverse polarity thereto;
a gate control for applying a gate control signal to said main thyristor units;
an overcurrent detector for applying an output signal in response to a predetermined overcurrent condition of said A.C. lines to said auxiliary thyristor unit; and,
a switching circuit for normally applying the control signal from said gate control to said main thyristor units only when the output signal of said overcurrent detector is absent.

* * * * *